United States Patent
Ghalambor et al.

(10) Patent No.: US 6,213,498 B1
(45) Date of Patent: Apr. 10, 2001

(54) SEAT BACK AIR BAG DEPLOYMENT SYSTEM

(75) Inventors: Haleh Ghalambor; Satoshi Mikutsu, both of Ann Arbor, MI (US); Takeaki Kato, Okazaki; Koichi Suzuki, Nishikamo-gun, both of (JP)

(73) Assignees: Toyota Technical Center USA, Inc., Ann Arbor, MI (US); Toyota Motor Corporation (JP)

( * ) Notice: Subject to any disclaimer, the term of this patent is extended or adjusted under 35 U.S.C. 154(b) by 0 days.

(21) Appl. No.: 09/266,098

(22) Filed: Mar. 10, 1999

(51) Int. Cl.⁷ .............................. B60R 21/16; B60R 21/22
(52) U.S. Cl. ...................................... 280/730.2; 280/728.2
(58) Field of Search ................................. 280/730.2, 728.2

(56) References Cited

U.S. PATENT DOCUMENTS

| | | | |
|---|---|---|---|
| 5,265,903 | * 11/1993 | Kuretake et al. | 280/730.2 |
| 5,639,111 | 6/1997 | Spencer et al. | |
| 5,700,028 | 12/1997 | Logan et al. | |
| 5,860,673 | * 1/1999 | Hasegawa et al. | 280/730.2 |
| 5,906,390 | * 5/1999 | Phillion et al. | 280/730.2 |
| 5,938,232 | * 8/1999 | Kalandek et al. | 280/730.2 |
| 6,045,151 | * 4/2000 | Wu | 280/730.2 |
| 6,074,003 | * 6/2000 | Umezawa et al. | 280/730.2 |

FOREIGN PATENT DOCUMENTS

| | | |
|---|---|---|
| 8-225052 | 3/1995 | (JP) . |
| 9-123860 | 10/1995 | (JP) . |
| 9-254735 | 1/1997 | (JP) . |

* cited by examiner

*Primary Examiner*—Brian L. Johnson
*Assistant Examiner*—Matthew Luby
(74) *Attorney, Agent, or Firm*—Gifford, Krass, Groh, Sprinkle, Anderson & Citkowski, P.C.

(57) ABSTRACT

An air bag deployment apparatus for a seat back includes a support bracket and deployment strap. The support bracket has a reaction surface which extends behind the air bag inflator. The deployment strap is sewn to the inside of a seam line, a trim cover, and extends from the front of the seat along the side to an aperture formed in a foam cushion. The strap passes through the cushion to the reaction surface of the support bracket. The support bracket may be formed with panels which parallel the alignment of the strap. The strap is supported without slack to reduce the gas force necessary for stable deployment of the air bag.

12 Claims, 4 Drawing Sheets

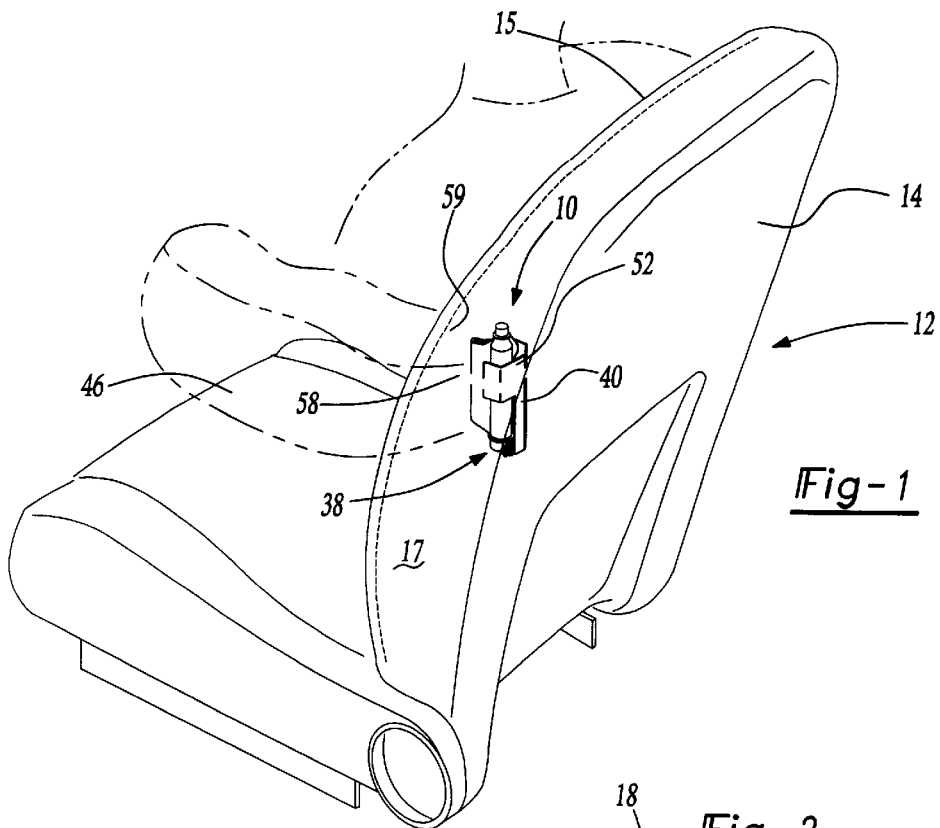
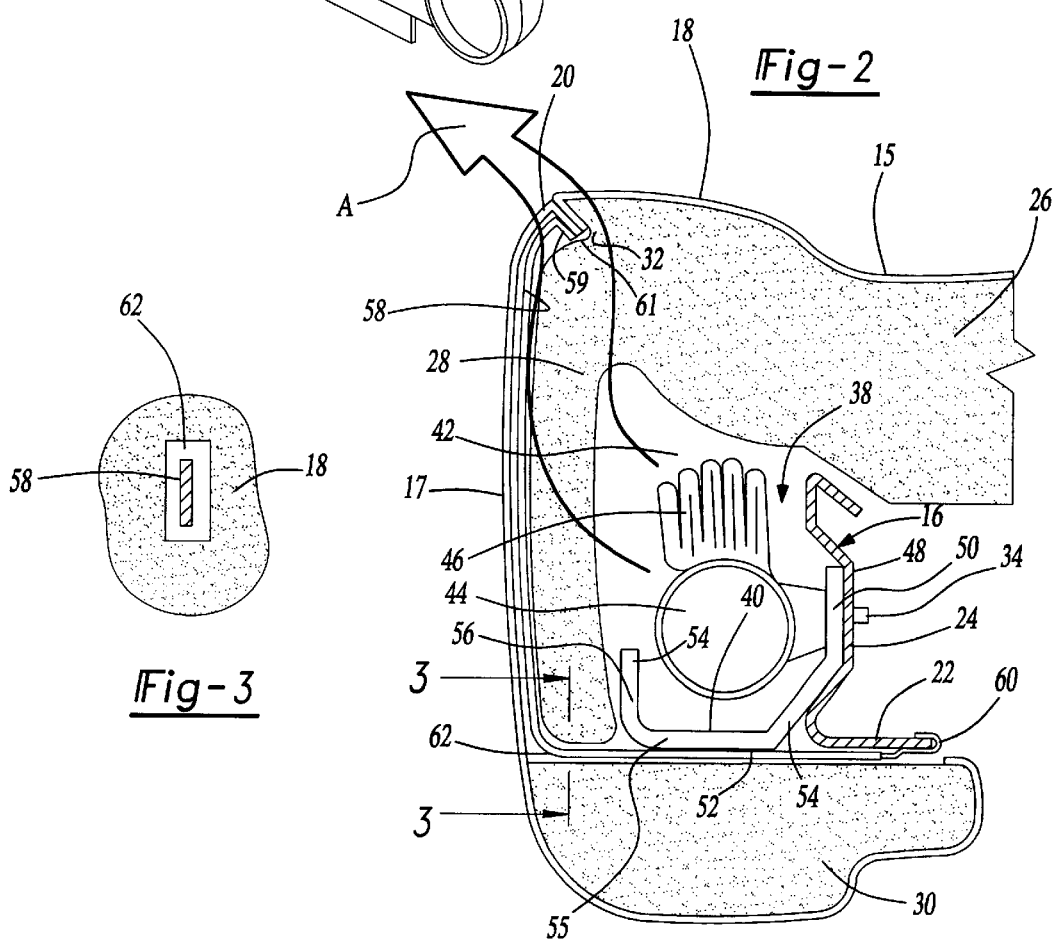

SEAT BACK AIR BAG DEPLOYMENT SYSTEM

BACKGROUND OF THE INVENTION

I. Field of the Invention

The invention relates to an air bag deployment system for side impacts, and more particularly, for a deployment system which is mounted in a seat back.

II. Description of the Related Art

In order to provide passengers of vehicles with protection from side impact, it is known to utilize air bags which are deployed from the vehicle seat backs to extend between a passenger and the vehicle side wall or door. The air bag module is mounted to the frame of the seat within a foam cushion. Upon activation, the air bag ruptures the cushion and a frangible seam line in the trim cover to extend outwardly from the seat back. Various methods have been used to ensure that the bag deploys properly. These include storing the bag within a box which has a frangible end to direct the direction of deployment, such as disclosed in U.S. Pat. No. 5,700,028. However, such an arrangement may alter the ergonomics and comfort of the seat back.

It is also known, as disclosed in Japanese laid-open Publication No. HE18-258660, to direct the deployment of the air bag to a seam in the trim cover between a pair of spaced apart flexible straps. One end of each strap is fixed to the frame and the other end is sewn to one side of the seam line. The straps follow the inside contour of the foam cushions. When the inflator is activated the air bag is inflated and deployed between two straps which direct the bag at the seam. However, the straps follow the contour of the foam so that deployment of the bag pushes outwardly against the foam, thereby producing slack in the straps with a resultant loss of energy.

It is also known to affix a single strap to the frame to extend around the foam cushion and inside of the trim cover to the seam line. The strap encircles a rear portion of the cushion as it travels from the frame to the seam line. When the air bag is deployed, the strap compresses the rear portion of the cushion. A substantial loss of energy arises because of the slack in the strap occurring during the compression of the foam cushion.

Accordingly, it would be desirable to produce a side impact energy management system having a relatively low gas pressure for deployment and is simply and inexpensively installed.

It is an additional object of the invention to present a side impact energy management system which has high repeatability of deployment and maintains the ergonomics of the seat.

SUMMARY OF THE PRESENT INVENTION

These and other objects are achieved by a side impact energy management system which includes an air bag module and support bracket which has an arm forming a reaction surface for providing a restraining strap. The reaction surface is positioned to extend behind the air bag module. In a preferred embodiment of the invention, the strap is guided laterally behind the air bag module to a uniform support for an aperture in the foam cushion by the reaction surface. The strap passes through the aperture and extends along an inside surface of the trim cover to a frangible seam line. The reaction surface and aperture in the cushion permit routing the strap in such a manner as to eliminate compression of the foam cushion by the strap during deployment of the bag. This results in a system which utilizes a relatively low gas pressure for deployment of the air bag.

A first alternative preferred embodiment of the invention includes a strap which loops around the cushion and a support bracket with a u-shaped arm. The strap is positioned to extend from the frame rearwardly and around the foam cushion. The arm has a reaction surface which is formed to parallel the alignment of the strap as it passes around the cushion. The strap extends rearwardly towards the back of the seat, laterally toward the side of the seat and then forwardly towards the front of the seat. The reaction surface is aligned to extend in a generally co-planar alignment with the strap. A small amount of the foam cushion is positioned between the reaction surface and the strap on the inside of the trim cover so that upon deployment there is minimal slack arising from the compression of the foam between the strap and reaction surface. Alignment of the reaction surface with the strap and the trim cover provides uniform support for the strap on deployment of the bag.

A second alternative preferred embodiment includes a strap that extends through an aperture in the foam cushion and support bracket with a reaction surface formed to extend co-planar with the alignment of the strap. The arm is formed like the arm of the first alternative preferred embodiment to extend co-planar with the strap as it travels from the seat frame to the inside of the seat cover.

DESCRIPTION OF THE DRAWING

These and other objects of the invention will be realized with respect to the preferred embodiments of the present invention as described below by way of example only with reference to the accompanying drawings in which:

FIG. 1 is a perspective view of a vehicle seat showing an air bag deployment apparatus in accordance with a preferred embodiment of the invention;

FIG. 2 is a partial cross-sectional view of the seat back showing an air bag module, a support bracket and a restraining strap in accordance with the preferred embodiment of the invention before deployment;

FIG. 3 is a side partial cross-sectional view taken along lines 3—3 of FIG. 2 showing the restraining strap passing through a foam cushion in accordance with the preferred embodiment of the invention;

DETAILED DESCRIPTION OF THE PREFERRED EMBODIMENTS

Figure 4:
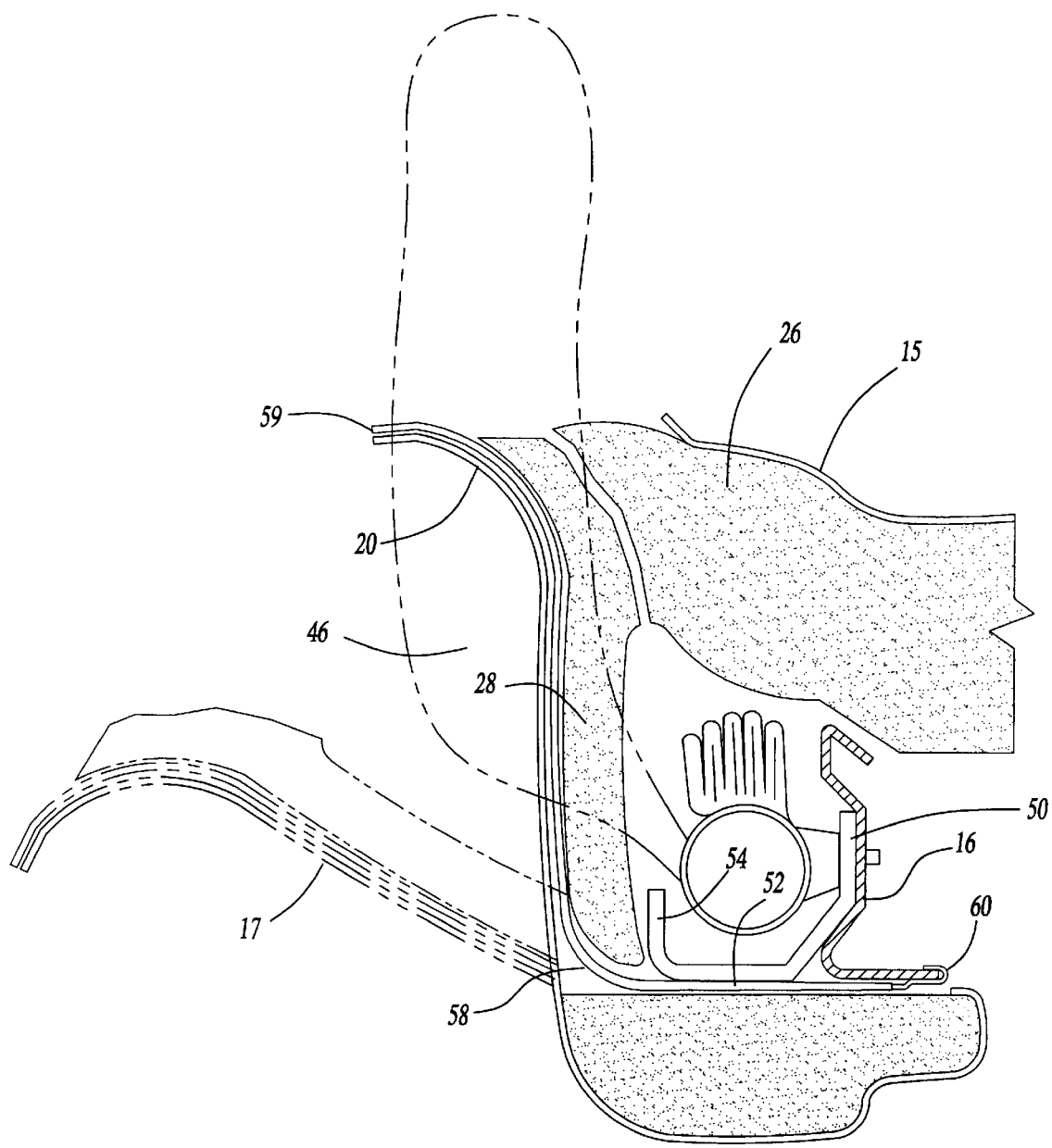
FIG. 4 is a cross-sectional view of the seat back showing an air bag as it is being deployed through the seat back utilizing the apparatus in accordance with the preferred embodiment of the invention.

A preferred embodiment of an improved air bag deployment apparatus 10 for a vehicle seat 12 in accordance with the invention is shown in FIGS. 1–4. As shown in FIG. 1, the seat 12 has a seat back 14 and a front surface 15 extending between two side surfaces 17. The front surface 15 is formed to support a passenger. The seat back 14 has a u-shaped frame 16 supporting a foam cushion 18 and trim cover 20 as best shown in FIG. 2. The frame 16 is formed of a rigid material such as metal or carbon fiber composite material. The frame 16 has rear flange 22 extending from an intermediate portion 24 of the foam cushion. The foam cushion has a generally c-shaped cross section with a center portion 26 extending between two side portions 28 and a rear portion 30 which extends inwardly from each of the side portions 28. The foam cushion is made of conventional foam material and encompasses the frame so that the frame 16 is sandwiched between the center portion 26 and the rear portions 30 of the cushion 18.

As shown in FIG. 2, the foam cushion 18 is covered by the trim cover 20 which is formed from fabric or leather. The trim cover 20 has a vertically extending frangible seam line 32. The seam line 32 extends vertically along the front surface 15 of the seat back 14 adjacent the side surface 17. The seam line 32 has sufficient length to permit deployment of an air bag 46. However, it may extend the full height of the seat.

An air bag module 38 and support bracket 40 are mounted by studs 34 to the intermediate portion 24 of the frame 16 in a cavity 42 formed between the frame 16 and the cushion 18. The air bag module 38 is of a conventional type and includes an elongated cylindrical inflator 44 having ports through which the inflator gas is discharged to inflate the air bag 46. The inflator 44 may be of any conventional construction and contains chemicals for generating a gas for discharge upon the existence of a predetermined condition. The air bag 46 is made of any conventional fabric material which is suitable for air bag construction. Before inflation, the fabric material of the bag 46 is folded in the cavity 42 and is aligned in front of the inflator in the direction of the seam line 32.

As shown in FIGS. 1 and 2, the support bracket 40 has an arm 48 extending generally outwardly towards the side portions 28 of the seat back from an elongated mounting portion 50. The mounting portion 50 of the support bracket 40 may be of any shape necessary to conform to the surface of the frame 16 and permit the arm to extend in a lateral direction outwardly from the frame 16 to the side surface 17 of the seat back. The mounting portion has apertures which are formed to accept the studs 34. The arm has an inner panel portion 54, intermediate panel portion 55, and an end panel portion 56 which extends around the rear of the inflator 44. The inner panel portion 54 conforms with an angled portion of the frame 16. The intermediate panel portion 55 extends from the inner panel portion 54 in a lateral direction towards the side surface 17 of the seat back. The end panel portion 56 is bent approximately 90° from the intermediate panel portion 55 to parallel the side surface 17 of the seat back. A reaction surface 52 extends along an outer surface of the intermediate panel portion 55 and end panel portion 56 to support a deployment strap 58. In the preferred embodiment, the support bracket 40 is formed in a conventional manner from a rigid material such as metal.

As shown in FIGS. 1 and 2, one end 59 of the deployment strap 58 is sewn on the inner surface of the trim cover near an edge 61 forming the seam line 32. The strap 58 extends to a unshaped clip 60 which is mounted to the other end of the strap 58. The clip 60 engages the rear flange 22 of the frame. The strap 58 may be formed of any suitable flexible material having a low modulus of elasticity, such as the material from which seat belts are formed. In the preferred embodiment, the strap 58 is approximately 65 mm in width, and approximately 230 mm in length. Advantageously, the strap 58 extends from the frame 16 along the reaction surface 52 of the intermediate portion of the arm and through an aperture 62 in the foam cushion 18, as shown in FIGS. 2 and 3. The aperture 62 extends through the side portion 28 of the cushion 18 laterally outwardly from the frame 16 and arm 48 of the support bracket. The aperture 62 is approximately 20 mm wide and 100 mm in height to freely accept the strap 58 therethrough. After exiting the aperture 62 the strap turns approximately 90° to extend between the cushion 18 and trim cover 20 to the seam line 32.

As shown in FIG. 2, the air bag 46 deploys generally in the direction of the seam line as shown by the arrow "A". As shown in FIG. 4, the deployment strap 58 restrains the trim cover to rupture the cushion 18 and the seam line 32 and direct the bag 46 through the ruptured seam line during deployment. A small amount of the foam cushion 18 adjacent the end 56 is compressed against the end portion 56 of the support bracket in response to the force of the bag as it is being deployed. However, the strap 58 is supported by the reaction surface 52 of the arm so there is virtually no slack in the strap 58. This results in stable deployment of the air bag and a significant reduction in the gas pressure necessary to deploy the bag.

Figure 5:
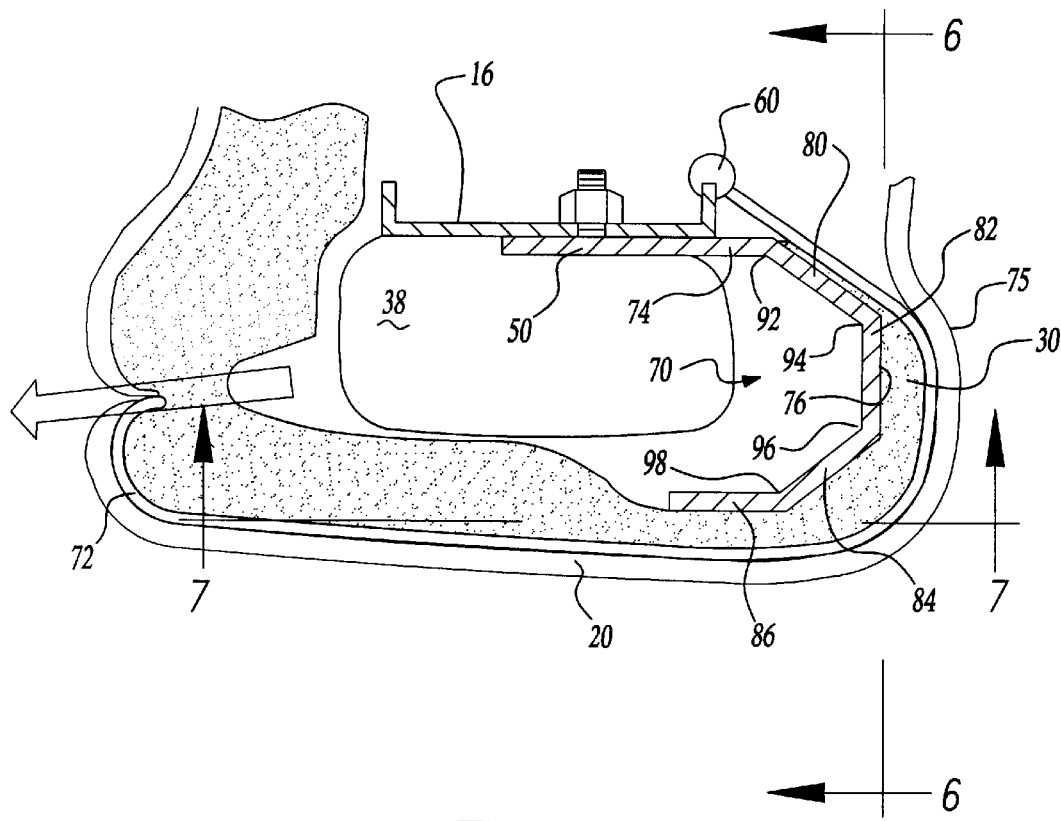
FIG. 5 is a cross-sectional view of a seat back showing a first alternative preferred embodiment of the invention before deployment.

A first alternative preferred embodiment of a side impact deployment apparatus is shown in FIGS. 5 through 9. The first alternative embodiment includes a modified support bracket 70 and a strap 72 which loops around the cushion 18 rather than passing through an aperture as discussed above. As shown in FIG. 5, the support bracket 70 has an arm 74 with a reaction surface 76 which is formed to parallel the path and alignment of the strap 72 as it travels in a path around the cushion 18. The strap 72 extends from the frame 16 rearwardly to the inside of the trim cover 20 at the back 75 of the seat and then around the rear portion cushion 18. The strap 72 then extends along the inside of the trim cover 20 along the inside of the trim cover to the seam line. The strap includes the clip 60 and is sewn to the seam line as discussed above.

Figure 6:
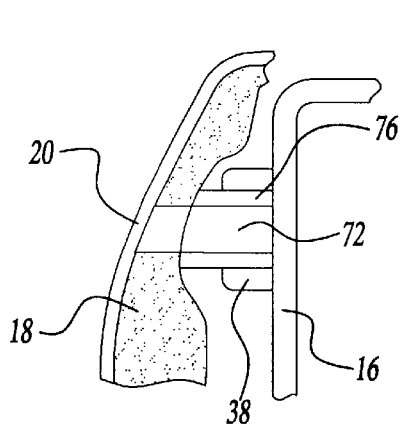
FIG. 6 is a partial rear view of the first alternative preferred embodiment of the invention taken along lines 6—6 of FIG. 5.
Figure 7:
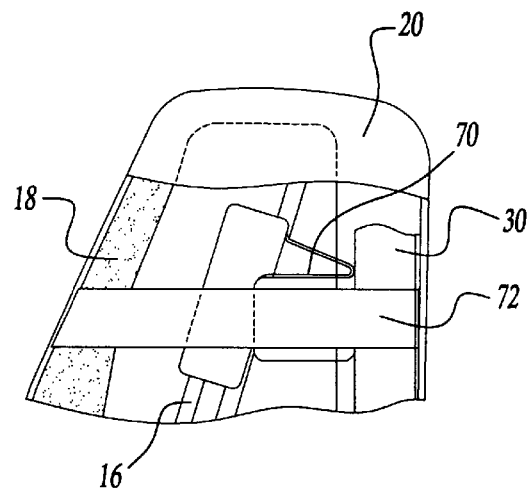
FIG. 7 is a partial cut away side view of the first alternative preferred embodiment of the invention taken along lines 7—7 of FIG. 5.
Figure 8:
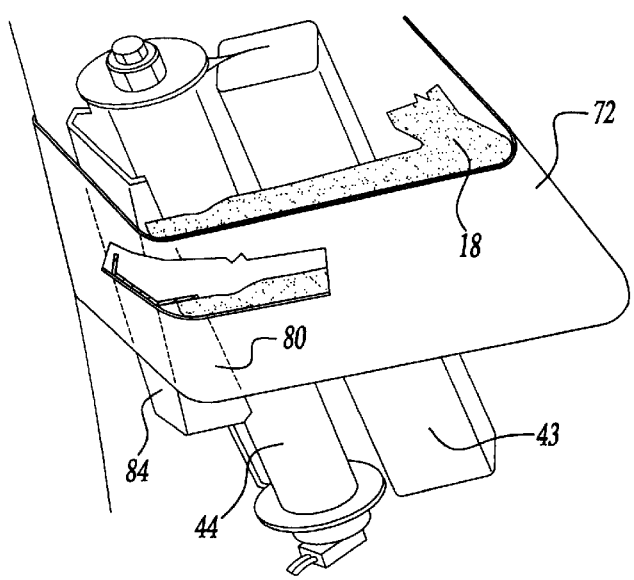
FIG. 8 is a perspective view of a air bag deployment apparatus according to a first alternative preferred embodiment of the invention.
Figure 9:
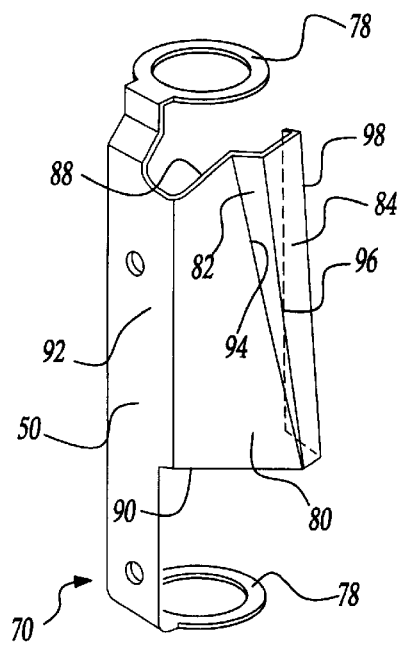
FIG. 9 is a perspective view of a support bracket of the first alternative preferred embodiment of the invention.
Figure 10:
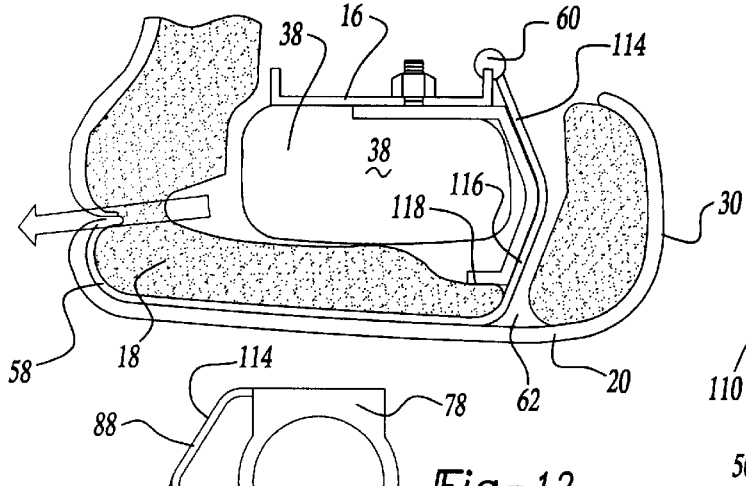
FIG. 10 is a cross-sectional view of a seat back and an air bag deployment apparatus according to a second alterative preferred embodiment of the invention.

As shown in FIGS. 7 and 9, the support bracket 70 includes the mounting portion 50 with rings 78 for holding the inflator (not shown) and the arm 74. Since the shape of the seat may be angled with respect to the frame 16 as shown in FIG. 7 or sloped inwardly as shown in FIG. 6, the arm has four panel portions which are formed to parallel the path and alignment of the strap. The arm 74 includes an inner panel portion 80, a rear panel portion 82, a corner panel portion 84, and an end panel portion 86.

The inner panel portion 80 extends from a top edge 88 to a bottom edge 90 and between a first bend line 92 and a second bend line 94. The inner panel portion 80 extends on an angle towards the back of the seat back from the mounting portion 16 and first bend line 92 as shown in FIG. 5. The rear panel portion 82 is wedge-shaped and defined by the second bend line 94 and third bend line 96. The rear panel portion 82 extends parallel to the rear surface of the seat back. The wedge-shaped corner panel portion 84 extends between the third bend line 96 and a fourth bend line 98.

As shown in FIGS. 7 and 9, the corner panel portion is wider at the top edge 88 than at the lower edge 90 and angles inwardly from the bottom edge 90 to the top edge 88 to parallel the shape of the seat back as it turns from the rear along the side. The end panel portion 86 has a wedge-shape which is wider at the bottom edge 90 than the top edge 88 and angles inwardly as it extends upwardly to parallel the side surface of the seat back. Thus, the arm is smaller at its upper edge 88 than at the bottom edge 90.

As shown in FIG. 6, the reaction surface 76 is formed so that the width of the foam cushion sandwiched between the strap 72 and reaction surface is constant and uniform from top to bottom and around the path. In this way, the strap uniformly supports the inner surface of the seat back cushion and the strap. The uniform contact relationship between the arm 74 and the inner surface of the seat back cushion enables the power generated at the deployment of the side air bag to be uniformly transmitted to the strap. This provides a stable deployment of the air bag in a predetermined direction at a low gas pressure. Moreover, this arrangement permits it to be properly deployed despite the fact that it is quite close to an occupant.

Figure 11:
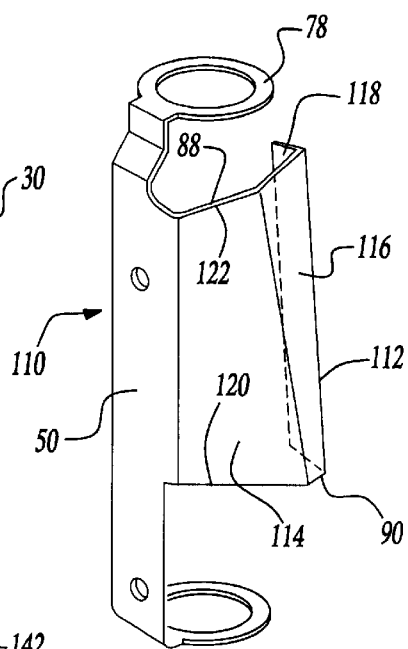
FIG. 11 is a perspective view of a support bracket of the second alternative preferred embodiment of the invention.
Figure 12:
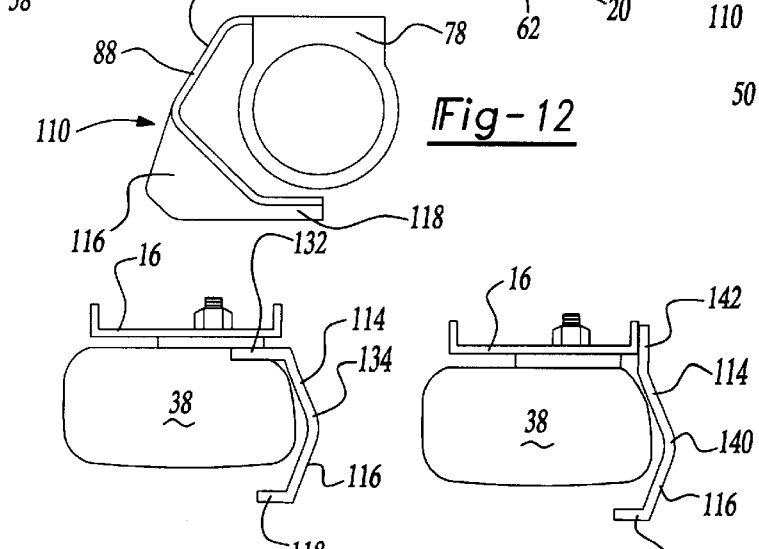
FIG. 12 is a top view of the support bracket of the second alternative preferred embodiment of the invention.

A second alternative preferred embodiment of the side impact deployment apparatus is shown in FIGS. 10–14. This apparatus utilizes a support bracket 110 similar to that of the first alternative preferred embodiment with the strap 58 which extends through the aperture 62 in the seat cushion as disclosed in the preferred embodiment above. As shown in FIGS. 11 and 12, the support bracket may be stamped in one piece with a mounting portion 50 and arm 112. The arm 112 has an inner panel portion 114, an intermediate panel portion 116 and an end panel portion 118. The inner portion 114 and intermediate panel portions 116 extend generally laterally outwardly from the frame towards the side of the seat back.

As shown in FIGS. 11 and 12, the intermediate panel portion 116 and end panel portion 118 angle inwardly from a bottom edge 120 to a top edge 122 with respect to the mounting portion 50. Thus, the arm 112 is wider at the bottom edge than at the top but is formed to parallel the alignment of the strap 58. The strap 58 is placed in a generally vertical alignment from the angled alignment where the clip 60 is attached to the frame 16.

Figures 13, 14:
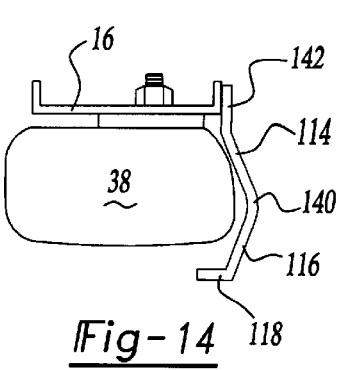
FIG. 13 is a cross-sectional view of a support bracket having an arm welded in position in accordance with the second alternative preferred embodiment of the invention.
FIG. 14 is a cross-sectional view of an arm with a reaction surface which is welded to the frame in accordance with the second alternative preferred embodiment of the invention.

As shown in FIG. 13, the support bracket may be formed in two pieces, a mounting portion 132 and an arm 134 which are welded together.

As shown in FIG. 14, alternatively, the support bracket may be an arm 140 having a flange 142 at its inner end for mounting directly to the back of the frame 16 of the seat back 14.

While the present embodiments have been described in specific embodiments thereof, it is not intended to be limited thereby, but is intended to cover the invention broadly within the scope of the spirit of the claims.

What is claimed is:

1. An air bag deployment apparatus for a seat of a vehicle having an air bag module having an air bag mounted to provide side impact protection for a passenger, said apparatus comprising:

a seat back having a front portion, a rear portion, and a side portion, said seat back further having a frame and a cushion extending about said frame to form a cavity, said frame having a front portion adjacent said front portion of said seat back and a rear portion adjacent said rear portion of said seat back said seat back having a trim cover extending over said cushion, said trim cover having a frangible seam line having an edge;

an air bag module mounted to said frame within said cavity;

a support bracket mounted to said frame and having a rigid arm extending from said frame towards said side portion of said seat back, said arm spaced apart from said air bag module and extending from said rear portion of said frame between said air bag module and said rear portion of said seat back, said arm forming a reaction surface on one side; and a strap mounted to said frame and extending across said reaction surface of said arm, one end of said strap being attached to said frame and an opposite end being attached to said trim cover at said seam line such that said strap is directed away from said air bag module during deployment of said air bag.

2. The apparatus of claim 1, wherein said support bracket further comprises an end portion extending in a direction toward said front portion of said seat back.

3. The apparatus of claim 1, wherein a portion of said strap is disposed between said cushion and said trim cover.

4. The apparatus of claim 1, wherein said cushion further comprises a side portion having an aperture formed to extend through said side portion between said support bracket and trim cover.

5. The apparatus of claim 1, wherein said cushion has a rear portion extending rearwardly of said air bag module, said strap passing over a portion of said rear portion and said reaction surface.

6. The apparatus of claim 5, wherein said arm further comprises an inner panel portion extending from a mounting portion toward said rear portion of said cushion.

7. The apparatus of claim 6, wherein said arm further comprises a plurality of panel portions extending coplanar with the alignment of adjacent portions of said strap.

8. The apparatus of claim 1, wherein said support bracket has an end portion extending in a direction toward said front portion of said seat back.

9. The apparatus of claim 8, wherein said support bracket has an end portion extending in a direction toward said front portion of said seat back.

10. The apparatus of claim 9, wherein said arm further comprises an inner panel portion extending from a mounting portion towards said rear portion of said seat back.

11. The apparatus of claim 1, wherein a reaction surface to be formed on said arm comprises a three dimensional shape according to the structure of the seat cushion which is adapted to be substantially and uniformly applied with the lead by the strap at the deployment of said bag.

12. An air bag deployment apparatus for a seat of a vehicle having an air bag module mounted to provide side impact protection for a passenger, said apparatus comprising:

a seat back having a front portion, a rear portion, and a side portion, said seat back further having a frame and a cushion, said cushion having an inner surface and an outer surface, said outer surface of said cushion adjacent said trim cover and said inner surface adjacent said cavity, said cushion having a side portion adjacent said side of said seat back, said side portion of said cushion having an aperture extending about said frame to form a cavity, said seat back having a trim cover extending over said cushion, said trim cover having a frangible seam line having an edge;

an air bag module mounted to said frame within said cavity;

a support bracket mounted to said frame and having an arm extending from said frame towards said cushion side portion of said seat back, said arm forming a reaction surface on one side; and a strap having one end mounted to said frame and extending across said reaction surface, said strap passing through said aperture of said cushion and between said trim cover and said outer surface of said cushion to extend along said outer surface of said cushion along said side of said seat back, and said strap having an opposite end being attached to said trim cover at said seam line.

\* \* \* \* \*